UNITED STATES PATENT OFFICE.

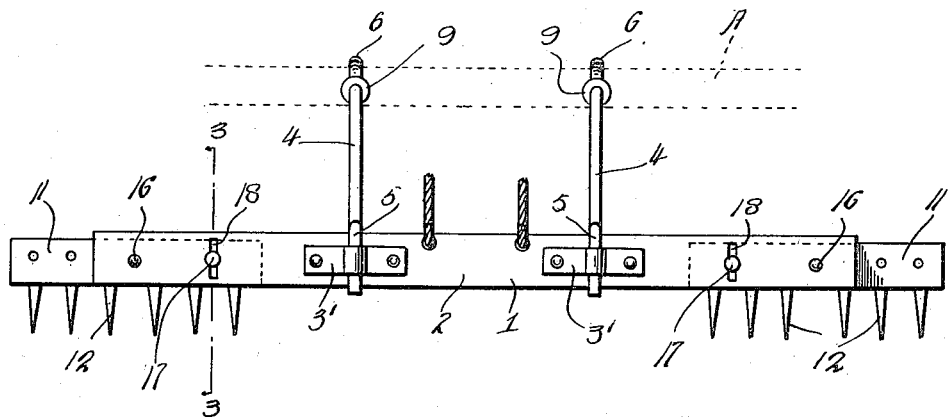
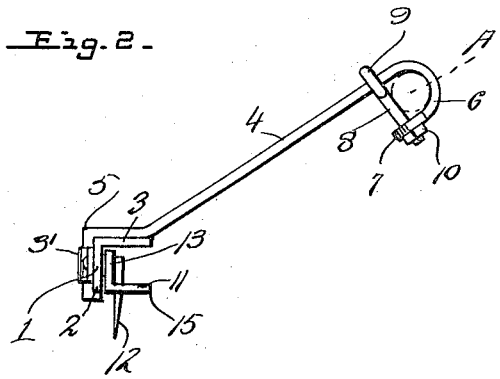
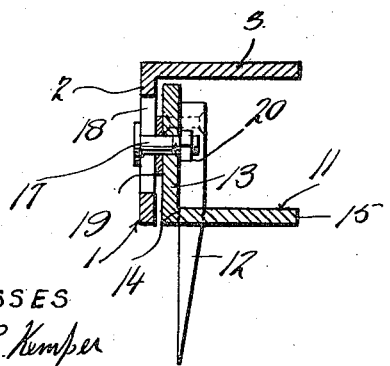

GEORGE H. SCHRUM, OF TEMPLETON, IOWA.

HARROW.

1,241,033.  Specification of Letters Patent.  Patented Sept. 25, 1917.

Application filed September 12, 1916. Serial No. 119,675.

*To all whom it may concern:*

Be it known that I, GEORGE H. SCHRUM, a citizen of the United States, residing at Templeton, in the county of Carroll and State of Iowa, have invented certain new and useful Improvements in Harrows, of which the following is a specification.

This invention has reference to a harrow adapted for use in connection with a corn planter and the primary object is to provide a harrow which will travel behind the corn planter and follow the path of the wheels which support the planter.

A further object of the invention is to provide a harrow of this character having means whereby the device may be quickly attached to or detached from the rear of a corn planter and held in pivotal engagement with the rear structure of the planter so that the harrow may rise and fall easily with the undulation in the ground.

As a further object of the invention the device is provided with a pair of pivoted members having the harrow teeth attached thereto and pivotally supported by the harrow bar so that a limited pivotal movement is provided for the harrow teeth when the device is in operation.

A further object of this invention is the provision of a harrow which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a rear elevation of the device in attached position showing the rear bar of a corn planter in dotted lines.

Fig. 2 is an end elevation.

Fig. 3 is an enlarged vertical section on the line 3—3 of Fig. 1.

Referring to the drawing, wherein is illustrated the preferred form of my invention, and in which like numerals of reference indicate corresponding parts throughout the several views, the harrow bar 1 is formed of a length of angle iron comprising the vertical plate 2 and the horizontal top plate 3. Mounted upon the vertical plate 2 of the harrow bar is a pair of clips, each designated by the numeral 3', for receiving the draft bars 4. Each draft bar 4 is formed of a rod bent at one end to provide a hook 5 the end of which is fastened to the bar 1 by the clip 3'. The opposite end of the rod is bent to provide a yoke 6 having an eye 7 formed at its terminal. An eye bolt 8 is employed in connection with each draft bar 4 and the eye 9 of the bolt receives the straight portion of the rod while the opposite end of the bolt is extended through the eye 7 and receives a fastening nut 10. This construction provides a means for receiving a bar A provided at the rear of the corn planter. It will be observed that the extreme end of the hook 5 is bent to fit around the lower edge of the vertical plate 2 of the harrow bar thereby preventing the end of the hook from being withdrawn from the harrow bar when the device is in motion.

Each end of the harrow bar carries a toothed member 11 formed of a short length of angle iron, as clearly shown by Fig. 3 of the drawing. A plurality of harrow teeth 12 are attached to the vertical plate 13 of the harrow member and these teeth extend through apertures 14 formed in the laterally extending flange 15 of the toothed member 11. The central portion of the toothed member 11 is pivotally mounted upon the pivot pin 16 carried by the end of the bar 1. The inner end of each toothed member 11 carries a bolt 17 extending through a slot 18, one of which is formed in each end of the bar 1 so that the pivotal motion of the member 11 is limited by the length of the slot 18. Interposed between the vertical flange 2 and the member 11 is a washer 19 and the bolt 17 is held in place by the nut 20 which is screw threadedly mounted upon the end of the bolt.

In operating the device it is merely necessary to attach the same to the rear end of a corn planter and the toothed member 11 will be disposed directly behind the wheels of the planter which, of course, usually follow directly behind the corn dropping mechanism. The surface of the ground, therefore, is operated upon by the harrow in the proper place for deriving the greatest benefit and the common practice of harrowing an unnecessary surface of the ground is thereby obviated.

From the foregoing it will be observed that a very simple and durable harrow has been provided, the details of which embody the preferred form. I desire it to be understood however, that slight changes in the minor details of construction may be made without departing from the spirit of the invention or the scope of the claims hereunto appended.

I claim:

1. A harrow comprising a harrow bar formed of a length of angle iron, a pair of toothed members pivotally mounted one upon each end of one flange of the angle iron, and draw bars attached to the said harrow bar.

2. A harrow comprising a length of angle iron forming a harrow bar having one flange disposed vertically and the adjacent flange projecting forwardly from the top thereof, a toothed member pivotally mounted to each end of the said harrow bar beneath the said forwardly projecting flange thereof, the said member including a short length of angle iron having one flange disposed vertically in close proximity to the vertical flange of the harrow bar, and its adjacent flange extending forwardly from the lower edge of the vertical flange.

3. A harrow comprising a harrow bar formed of a length of angle iron and provided with two slots, and a pair of toothed members pivotally mounted upon the bar, one at each end thereof, and a bolt carried by each member and extended through one of said slots for limiting the pivotal movement of the toothed member.

4. A harrow comprising a harrow bar formed of a length of angle iron having a vertical flange and a horizontal top flange, a pair of clips mounted upon the vertical flange, draw bars having their ends bent to provide yokes, and eye bolts adapted to coöperate with the said draw bars for securing the said draw bars in applied position.

5. In a harrow, the combination with a corn planter having a transversely arranged bar at its rear, of a harrow bar, means for attaching the said harrow bar to the said rear bar of the corn planter, and a pair of pivoted toothed members carried by the said harrow bar and disposed in the path of each wheel of the corn planter.

6. In a harrow, the combination with a corn planter having a transversely arranged bar at its rear, of a harrow bar formed of a length of angle iron and having a vertical slot arranged at each end, the said harrow bar carrying harrow teeth arranged in two groups, one behind each wheel of the said corn planter, and means for attaching the harrow bar to the rear bar of the corn planter whereby the rise and fall of the said harrow bar is permitted when the corn planter is in motion.

In testimony whereof I affix my signature in presence of two witnesses.

GEORGE H. SCHRUM.

Witnesses:
M. J. DAEGES,
A. STEPHENSON.

Copies of this patent may be obtained for five cents each, by addressing the "Commissioner of Patents. Washington, D. C."